United States Patent [19]
Dippel et al.

[11] Patent Number: 5,212,916
[45] Date of Patent: * May 25, 1993

[54] DEVICE FOR SHADING SPACES

[75] Inventors: Hans-Jurgen Dippel, Uhnigen-Kattenhorn; Peter Raupach, Kaipershof 22, D-8600 Bamberg, both of Fed. Rep. of Germany

[73] Assignee: Peter Raupach, Munich, Fed. Rep. of Germany

[*] Notice: The portion of the term of this patent subsequent to Jun. 6, 2006 has been disclaimed.

[21] Appl. No.: 360,991

[22] Filed: Jun. 2, 1989

Related U.S. Application Data

[63] Continuation-in-part of Ser. No. 242,719, Sep. 9, 1988, Pat. No. 4,835,918.

[51] Int. Cl.$^5$ ............................................. E04B 7/00
[52] U.S. Cl. ......................................................... 52/82
[58] Field of Search .......................................... 126/426

[56] References Cited

U.S. PATENT DOCUMENTS

| | | | |
|---|---|---|---|
| 3,411,050 | 11/1968 | Izu | 357/30 |
| 3,433,677 | 3/1969 | Robinson | 357/30 |
| 4,025,786 | 5/1977 | Hamilton | 136/244 |
| 4,115,486 | 9/1978 | Cowman | 52/80 |
| 4,411,490 | 10/1983 | Daniel | 126/440 |
| 4,587,951 | 5/1986 | Towsen | 52/82 |
| 4,604,494 | 8/1986 | Shepard | 136/244 |
| 4,607,656 | 8/1986 | Carter | 52/109 |
| 4,641,676 | 2/1987 | Lynch | 135/110 |
| 4,713,492 | 12/1987 | Hanak | 126/426 |

FOREIGN PATENT DOCUMENTS 3643487 6/1988 Fed. Rep. of Germany ...... 136/244

*Primary Examiner*—David A. Scherbel
*Assistant Examiner*—Creighton Smith
*Attorney, Agent, or Firm*—Bachman & Lapointe

[57] ABSTRACT

In an arrangement having a surface for accommodating photovoltaic cells which are adapted to be connected to a current collector or the like, in particular in the case of a roof skin which is stretched over frame members, the arrangement is formed in the manner of a net from cables and the photovoltaic cells are disposed at or between the junctions of the cables. The invention also includes the photovoltaic cells which are arranged floatingly at the flexible surface of the arrangement.

16 Claims, 5 Drawing Sheets

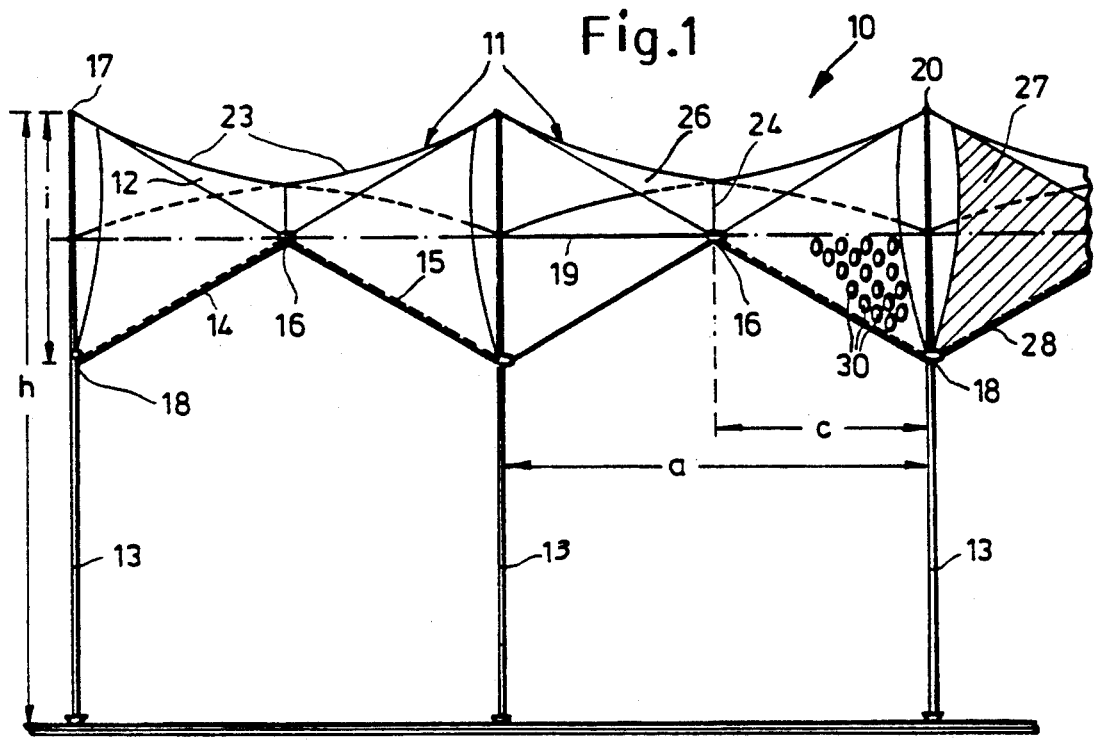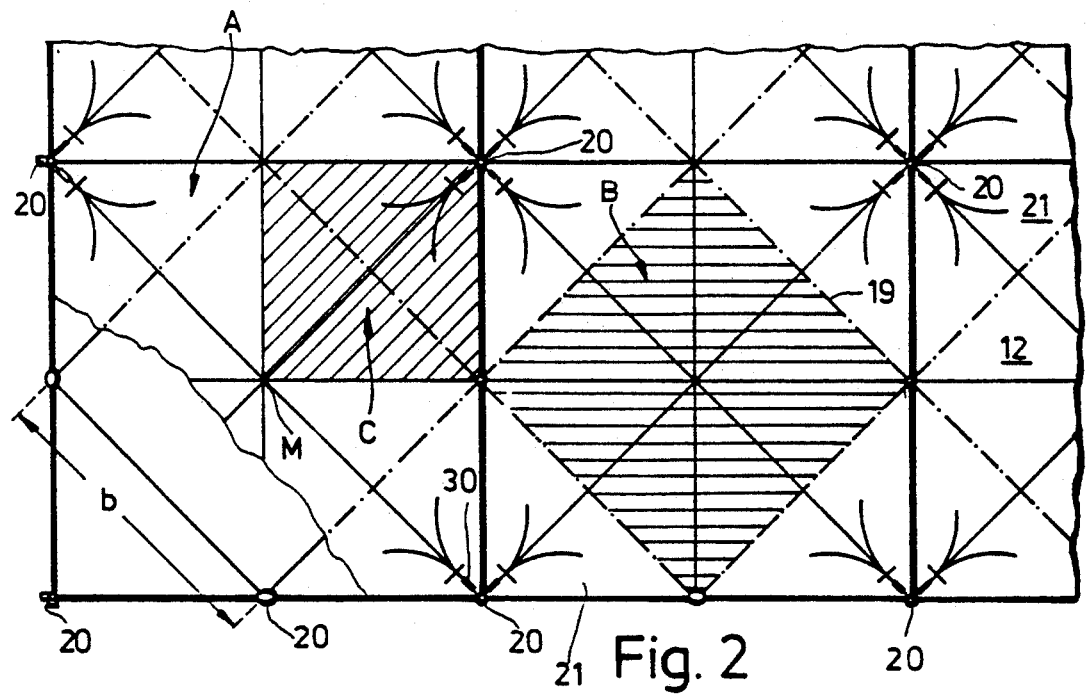

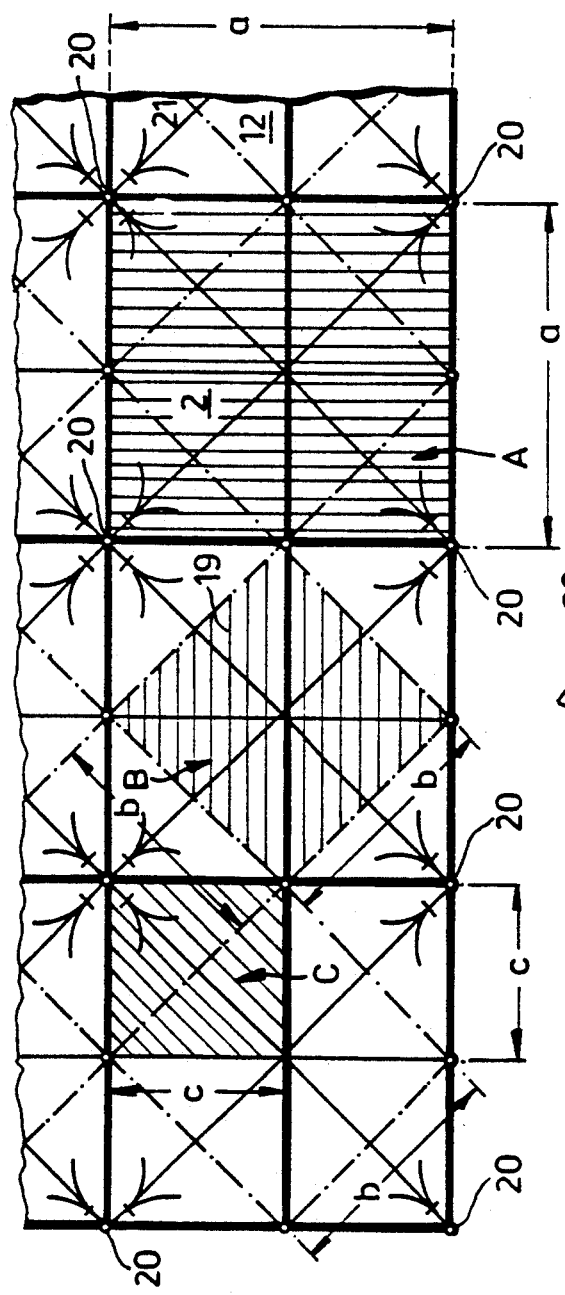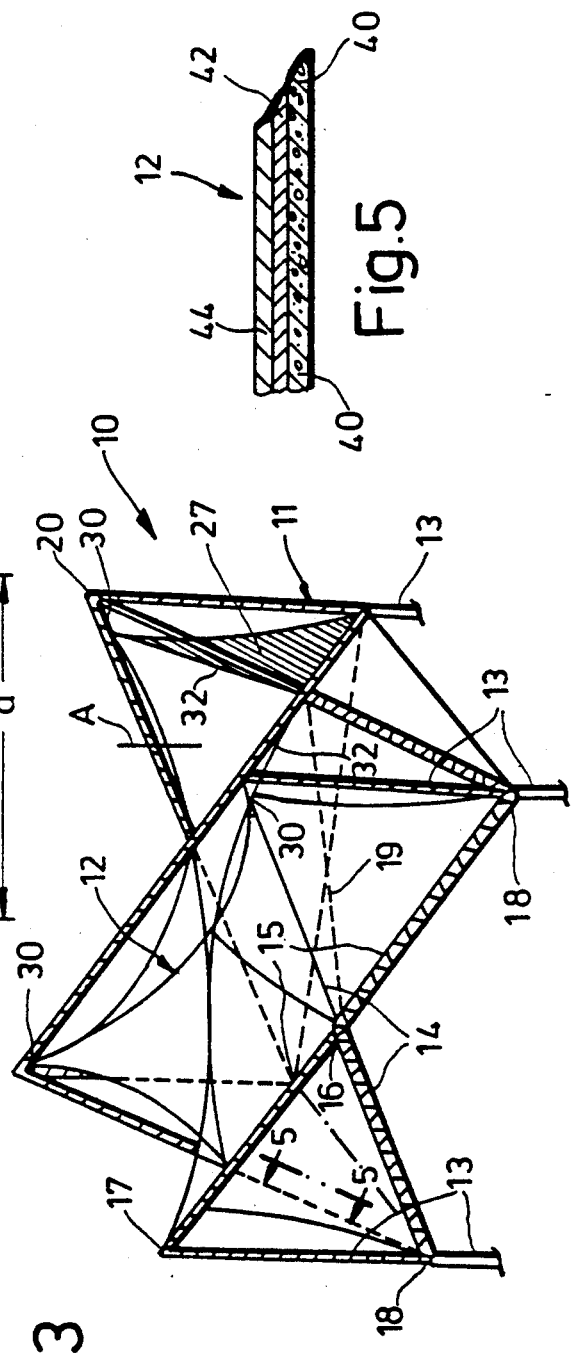

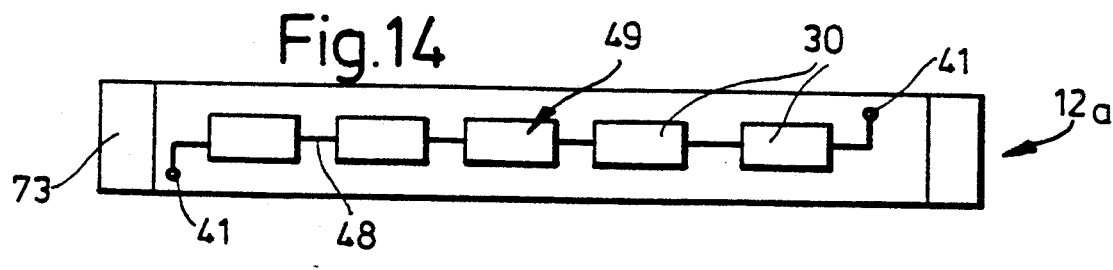
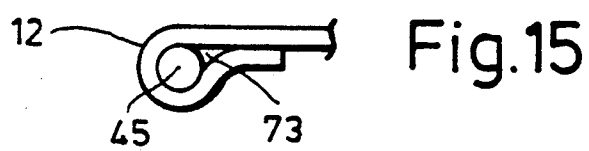
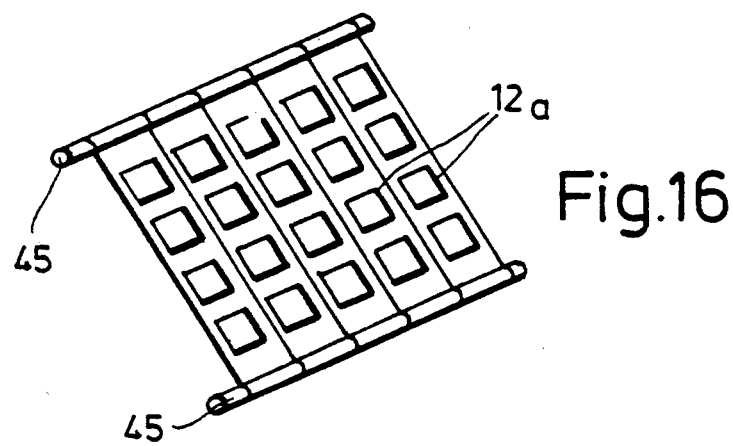
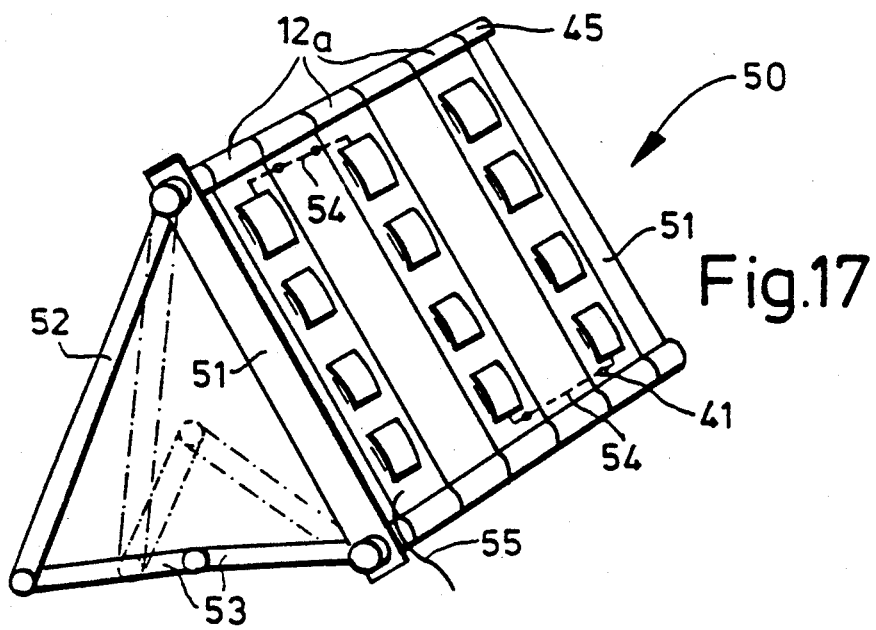

DEVICE FOR SHADING SPACES

CROSS REFERENCE TO RELATED APPLICATIONS

This is a continuation-in-part application of U.S. patent application Ser. No. 07/242,719, filed Sep. 9, 1988, entitled DEVICE FOR SHADING SPACES.

BACKGROUND OF THE INVENTION

The present invention relates to a device for shading spaces and in particular for shading areas or plazas where people can walk, in desert areas, comprising a flexible roofing surface which extend on carrier elements at a spacing from the surface to be shaded, preferably with a roof skin or membrane which is stretched on supports. The present invention further relates to a shading device formed from a light plane load-bearing structure and having photovoltaic means to convert sunlight into electricity.

Still further the invention relates to an arrangement having a flexible surface for accommodating photovoltaic cells, in particular a roof skin which is stretched over frame members, for shading surfaces or areas, wherein the cells are adapted to be connected to a current collector or the like.

It is known for roofing structures of that kind to be made from stretched tent cloths or from netting materials in order in that way, during the daytime, to keep the spaces therebeneath for pedestrians, vehicles or the like at bearable temperatures. Such roofing structures can be used exclusively for the purposes of providing shade and must be capable of withstanding high temperatures, in accordance with the use for which they are intended.

An arrangement having a roof skin for accommodating photovoltaic cells is shown in German laid-open application (DES-OS) No. 34 27 574 which illustrates a roof, the outward side of which is fitted with photovoltaic elements of that kind. The structure of such a photovoltaic cell can be seen for example in German laid-open application (DES-OS) No. 30 13 991. That involves using what is known as the barrier-layer photo effect or the photovoltaic effect. It occurs as a junction within a barrier layer between semiconductor and semiconductor, semiconductor and electrolyte, semiconductor and metal or metal and electrolyte, or in the immediate vicinity of a barrier layer. Charge carrier pairs produced by incident light are separated in the electrical field of the barrier layer, thereby producing a usable voltage.

Now, it has been found in practice that flexible carriers for photovoltaic cells of that kind are admittedly desirable, but that the use thereof involves problems, in particular in regard to the mechanical forces acting on the arrangement.

SUMMARY OF THE INVENTION

Having regard to those facts, the inventor set himself the object of so designing a device of the kind set forth in the opening part of this specification, that it is possible to provide for shading for larger spaces with the minimum amount of obstruction and trouble due to the use of supports, while at the same time making use of the effects of sunlight which is absorbed in providing the shading effects.

The inventor also set himself the aim of improving an arrangement of the kind set forth in the opening part of this specification, such that the photovoltaic elements are not loaded by the mechanical forces. In addition the invention seeks to improve the use of photovoltaic arrangements of that kind.

To achieve the first object, the invention proposes that the outward side of the roofing surface means be fitted with photovoltaic elements or be provided with a photovoltaic layer for converting light into electricity. Used to provide such a layer are amorphous silicon or cadmium derivatives which permit a high degree of adaption to and a close fit with the roof skins or membranes used, and which can also be matched to the oscillations thereof.

In another form of the roofing structure according to the invention, silicon crystals are applied in a flake-like or mutually partially overlapping relationship to the roof skin or membrane or a corresponding roof layer; that also provides for adaptation to the moving roof surface.

To achieve the second object, photovoltaic cells are arranged floatingly at a flexible roof surface, that is to say they are not fixedly connected thereto. This arrangement preferably uses photovoltaic cells with a layer of amorphous silicon or cadmium derivatives on a carrier plate; in accordance with the invention the latter is loosely applied to the flexible surface and covered over by a translucent protective foil which is attached to the roof skin, for example by being secured thereto by adhesive means, outside the cell. That kind of fixing ensures that the cell enjoys a long service life.

It has been found to be advantageous for a plurality of cells to be combined together by electrical connections to form a line which is now in turn fitted to the roof skin or flexible surface and covered over by the translucent protective foil.

The cells of the line may also be disposed in openings or recesses in the flexible surface, wherein the opening or recess is than covered over by the translucent protective foil.

An aspect of particular significance is the use of photovoltaic cells for flying or mobile uses, for which purpose use is made in accordance with the invention of flexible webs of material which are each provided with at least one of the above-discussed lines of cells; those webs of material can be easily transported, and assembled and tensioned at the point of use by means of a frame structure to form a larger surface. The end contacts of each line, which are in the form of quick-action connecting elements, are joined to the adjacent lines and the entire surface is then connected to a battery or the like which can now be easily charged up.

That combination of roofing structure and sunlight receiving means provides for considerably better use of the roof surfaces which hitherto were produced only to give shade, by virtue of the generation of electrical energy as an additional product.

If consideration is given to the large land areas which are to be found for example in Southern Europe, with solar cells standing on short posts, it will be clear that the present invention provides for the generation of power without taking up more area, by utilizing desirable shading cover structures.

Further advantages, features and details of the invention will be apparent from the following description of preferred embodiments and with reference to the accompanying drawings in which:

BRIEF DESCRIPTION OF THE DRAWINGS

FIG. 1 is a side view of a roofing structure according to the invention for shading large areas of spaces;

FIGS. 2 and 3 are plan views of a part of the roofing structure;

FIG. 4 is a slant view of a further embodiment of the roofing structure;

FIG. 5 is an enlarged sectional view according to line V—V of FIG. 4;

FIG. 7;

FIG. 14 is a plan view of a roof skin strip;

FIG. 15 is a side view of a part of the FIG. 14 structure; and

FIGS. 16 and 17 are side views of examples of use.

DETAILED DESCRIPTION

Figure 6:
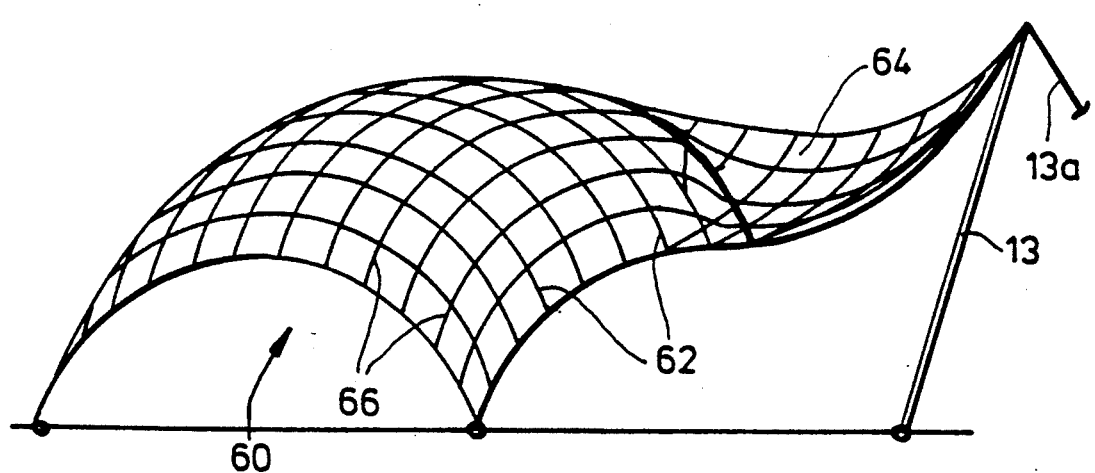
FIGS. 6 and 7 are side views of roofing structures according to the invention for shading large areas or spaces.

Referring to the drawings, a roofing structure 10 for shading large areas or spaces comprises a plurality of identical frame assemblies 11 and roof skins or membranes 12 which are stretched thereon to define a flexible roof surface. Mounted on the roof surface are photoresistive cell means 30 for converting light to electricity. It is possible with this type of roofing structure to generate electricity while shading large areas of spaces.

The flexible roof skins or membranes 12 may in one embodiment have a sandwich construction with a bottom layer 40 for carrying the tentering forces, a middle layer 42 consisting of a photovoltaic material (i.e. amorphous, polycrystalline, monocrystalline silicon or cadmium derivatives) and an upper layer 44 of a highly transparent cover close. It is possible with these flexible membranes and the support assemblies 11 to form synclastically tentered fabrics (tentered in a double opposed curved manner) such as shown in FIG. 4.

Four supports 13, which are for example 10 meters in height, form the respective corner pillars for a square roof support system comprising rods, struts, or bars 14 and 15, which cross at a central point of intersection 16 in the configuration of an X in a lying position. The rods or bars 14 and 15 are fixed at their ends to the supports 13 at upper and lower tensioning points 17 and 18 respectively which are spaced at a distance "i" from each other. The points of intersection 16 are engaged by the ends of horizontal screw rods, struts, or bars 19 which form a transversely diagonally extending stiffening system.

FIGS. 2 and 3 show the roofing structure 10 which consists of square surfaces or areas A, B and C, wherein the largest square A is defined by the points 20 on supports 13 with a horizontal spacing indicated at a, the middle square B is defined by the horizontal members 19 with a length of its side as indicated at b, the length b representing the diagonal of the smallest square C with a length of side as indicated at c, which corresponds to half the horizontal distance a between supports 13 or the spacing of the junction 16 from the support struts 13.

Between the four supports 13, the roof skin or membrane 12 is so tensioned that it forms a closed central roof surface 26 and corner portions 27 of a ship's bow-like configuration. One of the corner portions 27 is shown at the right-hand side of FIG. 1. The lower corner of the corner portion 27 is formed by the lower clamping point 18, while the side edge 28 which extends from the lower fixing point 18 is connected to the bars or struts 14 and 15. Thus, the roof skin 12 is suspended in a flutter-proof manner between the lower clamping points 18, the upper clamping points 17 and the members 14 and 15 in such a way as to provide two diagonal crest lines 23 and two pull lines 24 which cross the same at the center point M of the roof portion.

In order to be able to use the above-described roofing structure 10 which serves as a shading device, for the generation of power, mounted on the roof surface at 30 are photovoltaic cells which preferably comprise amorphous silicon and which convert the sunlight directly into electrical energy. The lines required for carrying the power away are not shown in the drawing for the sake of greater ease in viewing same.

Through the bending of the fabrics of the roof structure 12, folds 33 are formed, between the point 16 and the tenter facility arranged on both sides thereof. The folds limit a field A', onto which the corner portions 27 are connected. The cut according to FIG. 5 through the flexible roofing surface means 12 symbolically shows a supporting layer 40 which receives elastic forces, a layer 42 of photovoltaic material (amorphous, polycrystalline or monocrystalline siliconor cadmium-derivatives) as well as a highly transparent roof layer 44 of weatherproof foil.

The photovoltaic cells 30 may consist of a thin glass pane onto which a silicon layer is vacuum evaporated. Alternatively, the cells 30 may be made of foils which are thinly coated with amorphous silicon. Still further, the cells may use cadmium derivatives instead of silicon.

Many of the cells may be connected in series with the cells of one series forming a group. The groups—5, for instance,—can generate voltage of 10, 20, 40, 80 and 160 volts. A so-called inverter not shown can connect these fields with the public electric network. Suitable electronics measure the alternating voltage of the public network and synchronize with it the cell voltage. Thus, the electric power is fed into the public network.

In a silicon cell, there are two layers with different electric properties. On the ore side a greater amount of negatively charged electrons move between the atoms in the crystal lattice, on the other side a corresponding amount of positive charge carriers, the so-called holes, namely empty electron spaces, move in the crystal lattice. Since these holes are constantly occupied anew, they appear always in new positions—they behave like positive charge carriers migrating through the crystal lattice. In the so-called pn-transition (the electronic obstacle) in the cell result in the migration of the electrons and holes in opposed directions when photons hit the crystal lattice. Thus an electron flow is produced which is collected as electric current via contacts arranged outside the cell.

The photovoltaic elements 30 on the fabrics of the roof structure according to the invention are a simple line-up method for the photovoltaic which is simultaneously suitable for large-area roofing (providing shade, protection against weather). Furthermore, there is the possibility of including all components of a photovoltaic facility.

Figure 7:
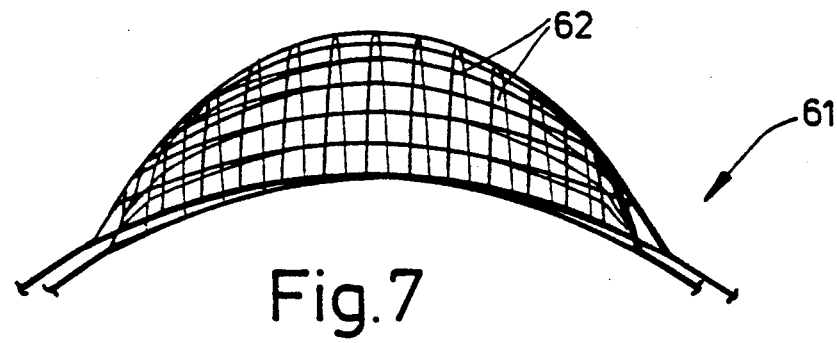

With reference to FIGS. 6 and 7, the roofing structures 60, 61 of FIGS. 6 and 7 are tensioned nets made of cable ropes 62. The structure 60 is formed with a domed-like configuration with at least one ear or corner 64 fixed on a pillar 13. This corner forms an anticlastical form of the structure. 13a shows a siderope, which stiffens the construction. The cable net 61 in FIGS. 7 and 8 is stretched in a bowl-like configuration.

At the crossing points 66 of the cable ropes 62 or in the areas 68, photovoltaic cells 30 are fastened. As before, the photovoltaic cells may comprise a layer of amorphous silicon or a layer of cadmium or a cadmium derivative. Alternatively, the photovoltaic cells may comprise silicon crystals in a flake-like and partially overlapping relationship fixed to the roof. It has been found that it is particularly desirable to use photovoltaic means such as the above which permit a high degree of adaptation to and close fit with the net-like roof of the crossing points of the cable ropes.

It should of course be recognized that the net-like roofing structure of FIGS. 6 and 7 could be arranged to form a synclastical surface using the support system shown in FIGS. 1-5.

Figure 8:
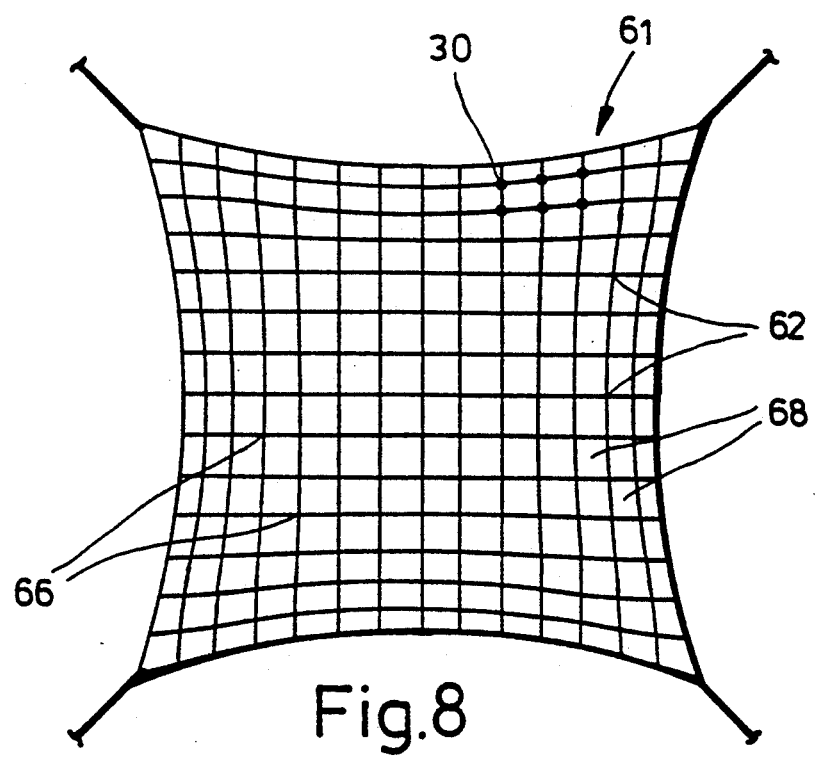
FIG. 8 is a plan view of the roofing structure o.
Figure 9:
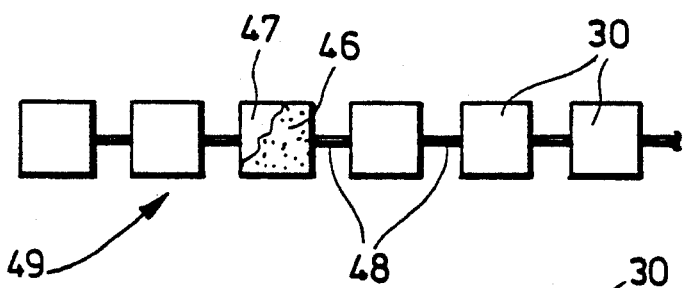
FIG. 9 shows a line of photovoltaic cells.
Figure 10:
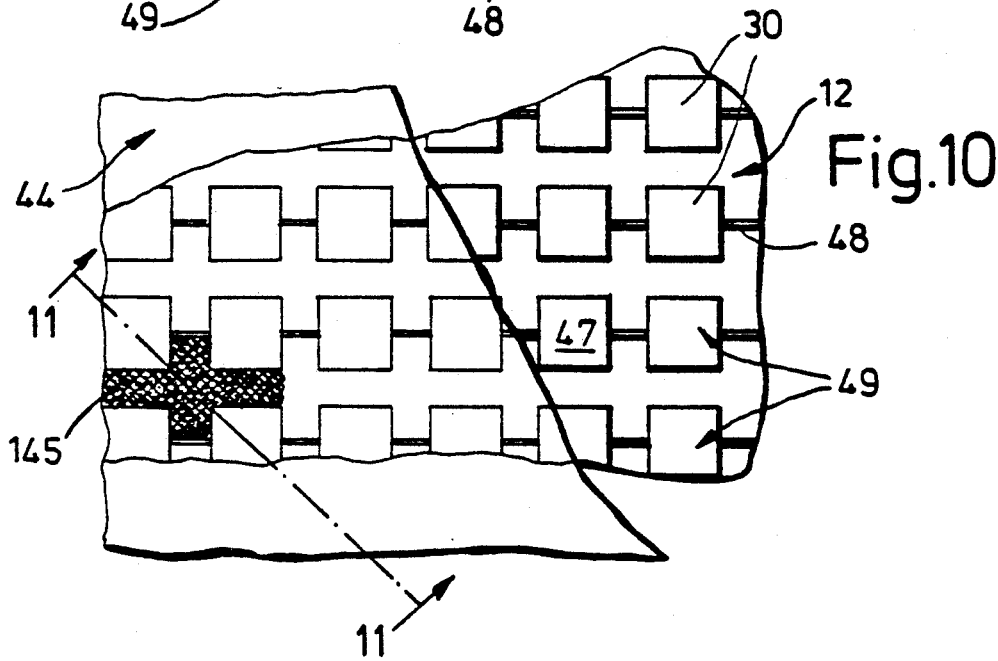
FIG. 10 is a plan view of an example of use.
Figure 11:
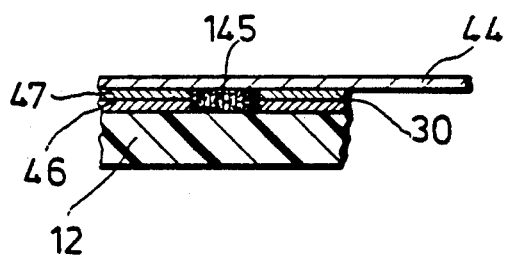
FIG. 11 is a view in section taken along line 11—11 in FIG. 10.
Figure 12:
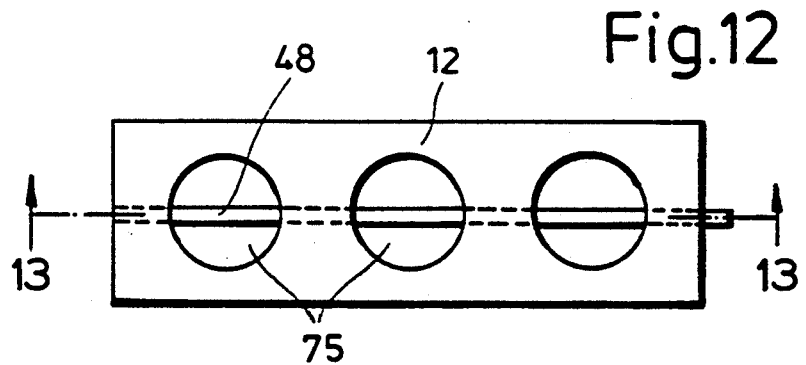
FIG. 12 is a plan view of a part of a roof skin.
Figure 13:
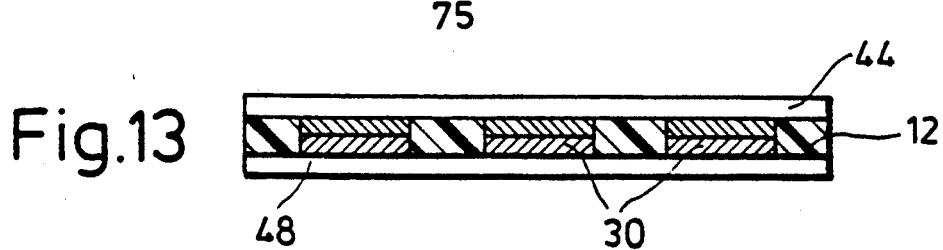
FIG. 13 is a view in section taken along line 13—13 in FIG. 12.

It has been found that the net-like roofing structure of FIGS. 6-8 is quite advantageous in allowing air cooling of the photovoltaic means.

With reference now to FIGS. 9-13, the photovoltaic cells 30 may comprise thin base plates 46 of light metal or alloy, which are each covered on one side by photovoltaically active layer 47. A plurality of the cells 30 may be combined together by electrical connections 48 to form a line 49.

One or more lines 49 may be applied to the roof skin 12 or a flexible surface forming all or part of the roof skin and covered over by a translucent protective foil 44. The foil is connected to the roof skin or flexible surface, for example by adhesive 145, outwardly of the line(s) 49. If desired, the cells 30 of each line 49 may be fitted into openings 75 in a flexible surface and covered over by the translucent protective foil 44. A plurality of roof skin strips 12a such as that shown in FIGS. 14 and 15 maybe connected by carrier tubes 45 and, as shown in FIG. 16, stretched to form a surface, for example as part of a tensioning frame structure 50, as indicated in FIG. 17. Support bars or struts 52 and foldable hinge arms 53 engage spreading members 51 for holding the pairs of carrier tubes 45 at the tensioning spacing.

The quick action press stud-like end contacts 41 maybe connected together by conduction strips 54 and maybe connected at their ends by cables 55 to a charging device which is not shown for the sake of enhanced clarity of the drawing.

That construction can be taken along on journeys or the like, as a kind of solar set, for charging up batteries, in a compact configuration.

The fabrics forming the roof skins or membranes of the roof structure, preferably polyester fabrics coated with TEFLON, do not necessarily have to be occupied with solar cells. Complete solar modules can be applied to the fabrics of the roof structure. Moreover, there is the possibility of integrating solar modules into a rope net which can be enlarged to form a complete roofing (similar to the roofing of the Olympic Stadium in Munich) with PLEXIGLASS plates being replaced by solar modules. The functional connection remains the same in both cases.

It can be seen that one of the advantages of the present invention is a price reduction of the basic construction of the PV-facilities is possible by directing solar modules to the sunlight by means of light plane load-bearing structures. This is possible also because the entire secondary facility (controller, storage, monitoring, measuring, etc.) of the PV-facility can be accommodated under the light plane load-bearing structure and no additional structure is required.

Further examples of application for the present invention are:

constructions of big rain-sprinkling installations—the partially filtered sun generates current which operates the pumps;

construction of warehouses, shelters, garages multifold use of the electricity; and roofing of refuse dumps, for special garbage, in particular, stadiums, etc.

It is apparent that there has been provided in accordance with this invention a device for shading spaces and generating electricity from sunlight which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A device for shading spaces, especially for shading areas or plazas where people can walk, which comprises:

a roof made of cable ropes forming a netlike or geodesic construction;

said roof having a synclastical or anticlastical surface;

said netlike roof including photovoltaic means for converting sunlight into electrical energy, said photovoltaic means permitting a high degree of adaptation to and a close fit with said netlike roof at crossing points of the cable rope; and said photovoltaic means comprising a plurality of photovoltaic cells combined together by electrical connections to form a line.

2. A device according to claim 1 wherein said photovoltaic means comprises a layer of amorphous silicon.

3. A device according to claim 1 wherein said photovoltaic means comprises a layer of cadmium or a cadmium derivative.

4. A device according to claim 1 wherein said photovoltaic means comprises silicon crystals fixed on the roof.

5. A device according to claim 4 wherein said silicon crystals are present in a flake-like and partially overlapping relationship.

6. A device according to claim 1 wherein said netlike roof allows air cooling of said photovoltaic means.

7. An arrangement having a surface for accommodating photovoltaic cells adapted to be connected to a means for collecting current which comprises a roof skin which is stretched over frame members, said roof skin being formed in the manner of a net from cables, the photovoltaic cells being disposed at or between the junctions of the cables and being combined together by electrical connections to form a line.

8. An arrangement having a surface for accommodating photovoltaic cells adapted to be connected to a means for collecting current which comprises a roof skin stretched over frame members, photovoltaic cells arranged floatingly on a flexible surface of the arrangement forming at least part of said roof skin and said photovoltaic cells being combined together by electrical connections to form a line.

9. An arrangement as set forth in claim 7 or claim 8 characterized in that each cell includes a layer of at least one of amorphous silicon and cadmium derivatives on a carrier plate.

10. An arrangement as set forth in claim 8 characterized in that the line is applied to the roof skin or said flexible surface and is covered over by a translucent protective foil which is connected to the roof skin or said flexible surface outwardly of said line.

11. An arrangement as set forth in claim 8 characterized in that the cells of said line are fitted into openings in the flexible surface and are covered over by a translucent protective foil.

12. An arrangement as set forth in claim 8 further comprising:
   said roof skin being formed in the manner of a net from cables; and
   said net structure allowing air cooling of said photovoltaic cells.

13. An arrangement having a surface for accommodating photovoltaic cells adapted to be connected to a means for collecting current which comprises a roof skin stretched over frame members, photovoltaic cells arranged floatingly on a flexible surface of the arrangement forming at least part of said roof skin, said photovoltaic cells being combined together by electrical connections to form a line, at least one line being fitted into a strip of a flexible web of material and each line having end contacts int he form of quick-action connecting means.

14. An arrangement as set forth in claim 13 further characterized by a plurality of strips, each having a line, set in juxtaposed relationship to provide a surface and said lines being electrically connected together.

15. An arrangement as set forth in claim 14 characterized in that a material web is provided at opposed ends of each strip with pockets for accommodating connecting bars.

16. An arrangement as set forth in claim 15 further characterized by a plurality of connecting bars forming part of a tensioning frame structure.

* * * * *